US009516532B2

(12) United States Patent
Hsu et al.

(10) Patent No.: US 9,516,532 B2
(45) Date of Patent: Dec. 6, 2016

(54) METHODS FOR CARRIER AGGREGATION

(71) Applicant: MEDIATEK, INC., Hsin-Chu (TW)

(72) Inventors: Chia-Chun Hsu, New Taipei (TW); Yih-Shen Chen, Hsinchu (TW); Yu-Hao Chang, TaiChung County (TW); I-Kang Fu, Taipei (TW)

(73) Assignee: MEDIATEK, INC., Hsin-Chu (TW)

( * ) Notice: Subject to any disclaimer, the term of this patent is extended or adjusted under 35 U.S.C. 154(b) by 0 days.

(21) Appl. No.: 14/168,369

(22) Filed: Jan. 30, 2014

(65) Prior Publication Data
US 2014/0146779 A1 May 29, 2014

Related U.S. Application Data

(63) Continuation of application No. 13/065,923, filed on Apr. 1, 2011, now abandoned.
(Continued)

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0096* (2013.01); *H04L 5/0098* (2013.01);
(Continued)

(58) Field of Classification Search
None
See application file for complete search history.

(56) References Cited

U.S. PATENT DOCUMENTS 8,351,359 B2    1/2013  Heo et al. .................. 455/509
8,867,666 B2 *  10/2014 Kim et al. .................. 375/316
(Continued)

FOREIGN PATENT DOCUMENTS

CN    101394199 A      3/2009
WO    WO2010027186     3/2010

OTHER PUBLICATIONS

International Search Report and Written Opinion of International Search Authority for PCT/CN2011/072431 dated Jun. 30, 2011 (13 pages).

(Continued)

*Primary Examiner* — Donald Mills
(74) *Attorney, Agent, or Firm* — Imperium Patent Works; Zheng Jin; Helen Mao

(57) ABSTRACT

Methods to manage multiple component carriers (CCs) efficiently in a mobile network with carrier aggregation (CA) enabled are proposed. For CC activation/deactivation, a single LCID value is used to represent both activation and deactivation command. A single command with multiple instructions is provided to activate and/or deactivate multiple CCs. In addition, unnecessary re-activation or re-inactivation of a CC is prevented, and explicit feedback for activation/deactivation is considered. For scheduling mechanism, a novel buffer status reporting (BSR) procedure is provided, where only one BSR is calculated after preparing all the transport blocks (TB) within one transmission time interval (TTI). Novel power headroom reporting (PHR) format and trigger are also provided. For DL-UL linking, various linking types are created based on whether there is carrier indicator field (CIF) in DL grant or UL grant. The various linking types are used in different applications to improve scheduling flexibility and load balancing.

13 Claims, 14 Drawing Sheets

Related U.S. Application Data

(60) Provisional application No. 61/320,345, filed on Apr. 2, 2010.

(51) Int. Cl.
   *H04W 72/12* (2009.01)
   *H04W 72/14* (2009.01)
   *H04W 52/36* (2009.01)

(52) U.S. Cl.
   CPC ..... *H04W 52/365* (2013.01); *H04W 72/1284* (2013.01); *H04W 72/14* (2013.01)

(56) References Cited

U.S. PATENT DOCUMENTS

| | | | | |
|---|---|---|---|---|
| 8,885,589 | B2* | 11/2014 | Kim et al. | 370/329 |
| 2010/0118720 | A1* | 5/2010 | Gauvreau et al. | 370/252 |
| 2010/0232385 | A1 | 9/2010 | Hsu | 370/329 |
| 2010/0302964 | A1* | 12/2010 | Guo | 370/252 |
| 2011/0105107 | A1* | 5/2011 | Kwon | H04W 48/08 455/422.1 |
| 2011/0105173 | A1 | 5/2011 | Haim et al. | 455/522 |
| 2011/0134774 | A1* | 6/2011 | Pelletier | H04W 52/365 370/252 |
| 2011/0242972 | A1 | 10/2011 | Sebire et al. | 370/229 |
| 2011/0243048 | A1* | 10/2011 | Wang et al. | 370/311 |
| 2012/0314675 | A1* | 12/2012 | Vujcic | 370/329 |
| 2013/0010964 | A1 | 1/2013 | Fong et al. | 380/277 |
| 2013/0136069 | A1 | 5/2013 | Baldemair et al. | 370/329 |

OTHER PUBLICATIONS

3GPP TSG-RAN WG2 Meeting #69, R2-101076, Nokia Siemens Networks, Nokia Corp., "Explicit Activation and Deactivation", San Francisco, U.S.A. Feb. 22-26, 2010.
3GPP TSG-RAN, Evolved Universal Terrestrial Radio Access(E-UTRA), Medium Access Control(MAC) protocol specification(Release 9), 3GPP TS 36.321 V9.1.0, Dec. 31, 2009(Dec. 31, 2009), sections 5.4.5-5.4.6.
3GPP TSG-RAN, Further Advancements for E-UTRA, Physical Layer Aspects(Release 9), 3GPP TR 36.814, V2.0.1, Mar. 31, 2010(Mar. 31, 2010) sections 5.1-5.3, A.2.1.1.3.
3GPP TSG-RAN, WG2 Meeting #68bis, R2-101015, 'Urgent System Information' to be configured at CC addition, Jan. 22, 2010(Jan. 22, 2010), pp. 1-4.
3GPP TSG-RAN WG2—Meeting #69, R2-101077, Nokia Siemens Networks, Nokia Corp., "On the Possibility for Implicit Release of Activated Secondary Component Carriers", San Francisco, U.S.A., Feb. 22-26, 2010, p. 1-2.
JPO, Office Action of JP application 2013-501617 dated Aug. 13, 2013 (5 pages).
3GPP TSG RAN WG1 Meeting #60 R1-101144; Samsung; Component Carrier Activation and Deactivation; Feb. 22-26, 2010, San Francisco, USA (5 pages).
3GPP TSG RAN WG2#69 R2-101150; MediaTek; Discussion on CC Avtivation and Deactivation; Feb. 22-26, 2010, San Francisco, USA (3 pages).
3GPP TSG RAN WG2#69 Tdoc R2-101179; Ericsson, ST-Ericsson; Further Details of Activation/Deactivation; Feb. 22-26, 2010, San Francisco, USA (2 pages).
3GPP TSG-RAN WG2 Meeting #69 R2-101759; Qualcomm Incorporated; Introduction of 4C-HSDPA; Feb. 22-26, 2010, San Francisco, USA (6 pages).
3GPP TSG-RAN2 Meeting #69 R2-101492; LG Electronics Inc.; CC Activation/Deactivation Details; Feb. 22-26, 2010, San Francisco, USA (2 pages).
3GPP TSG-RAN WG1#59bis R1-100277; Qualcomm Incorporated; Timer Based De-Activation of Secondary Carrier in Dual Band DC-HSDPA; Jan. 18-22, 2010, Valencia, Spain (1 page).
3GPP TSG RAN WG2#69 R2-101119; ETRI; DL Carrier Activation/Deactivation by MAC; Feb. 22-26, 2010, San Francisco, USA (2 pages).
Office Action for JP patent application 2013-501617 dated Jan. 21, 2014 (3 pages).
R2-101534 3GPP TSG-RAN2#69, NTT DoCoMo, Inc., DL and UL CC Linkage for Carrier Aggregation, San Francisco, U.S.A., Feb. 22-26, 2010(5 pages).
EPO, Search Reports for the EP patent application 11762022.9 dated Oct. 15, 2015 (8 pages) and Feb. 2, 2016 (13 pages).
3GPP TSG RAN WG2 Meeting #69 R2-101473, Component Carrier Activation and Deactivation, Research in Motion, UK Limited, San Francisco, USA dated Feb. 22-26, 2010 (3 pages).
3GPP TSG RAN WG2 Meeting #68 R2-096879, LG Electronics Inc., De-activation/Re-activation of Secondary Carrier, Jeju, South Korea dated Nov. 9-13, 2009 (2 pages).
3GPP TSG RAN WG1 Meeting #60 R1-101101, PH Reporting for Carrier Aggregation, Research in Motion UK Limited, San Francisco, USA dated Feb. 22-26, 2010 (2 pages).
Taiwan IPO, Office Action (no English translation is available) for the TW patent application 103133164 dated Dec. 25, 2015 (10 pages).
3GPP TSG RAN WG1 Meeting #60 R1-100921, Alcatel-Lucent Shanghai Bell et al., Power Headroom Reporting for Carrier Aggregation, San Francisco, CA. USA dated Feb. 22-26, 2010 (3 pages).
3GPP TSG-RAN WG2 #66bis R2-094003, NEC, Details on Carrier Aggregation Sinaling, Los Angeles, USA dated Jun. 29-Jul. 3, 2009 (3 pages).
TSG-RAN WG1 #53bis R1-082468, Ericsson, carrier Aggregation in LTE-Advanced, Warsaw, Poland dated Jun. 30-Jul. 4, 2008 (6 pages).

\* cited by examiner

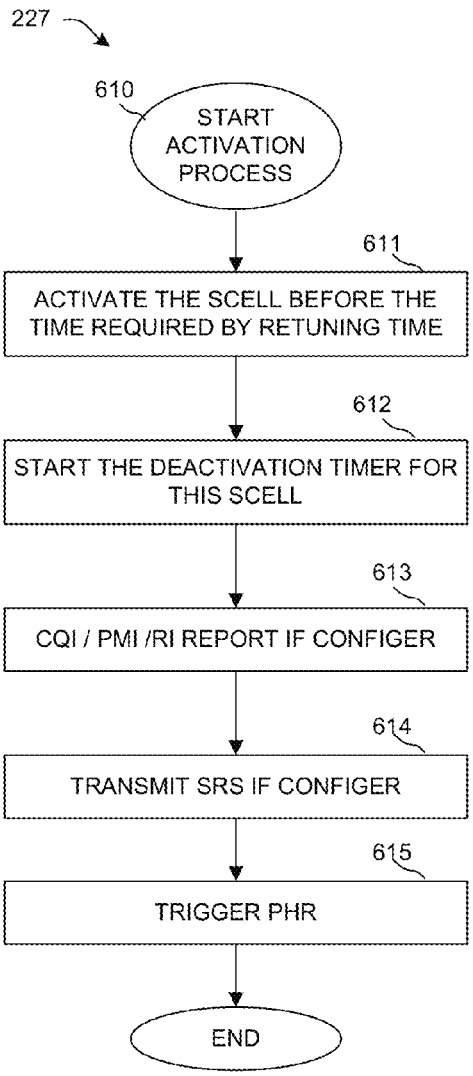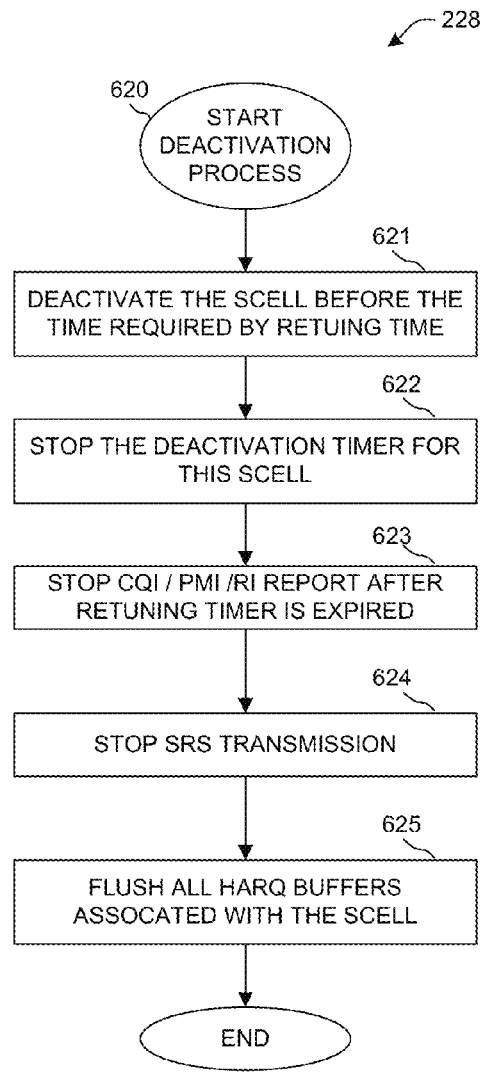
FIG. 6A
FIG. 6B

METHODS FOR CARRIER AGGREGATION

CROSS REFERENCE TO RELATED APPLICATIONS

This application is a continuation, and claims priority under 35 U.S.C. §120 from nonprovisional U.S. patent application Ser. No. 13/065,923, entitled "Methods for Carrier Aggregation," filed on Apr. 1, 2011, the subject matter of which is incorporated herein by reference. application Ser. No. 13/065,923, in turn, claims priority under 35 U.S.C. §119 from U.S. Provisional Application No. 61/320,345, entitled "Methods for Carrier Aggregation and MBMS," filed on Apr. 2, 2010; the subject matter of which is incorporated herein by reference.

TECHNICAL FIELD

The disclosed embodiments relate generally to wireless network communications, and, more particularly, to carrier aggregation in a mobile communication system.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNBs) communicating with a plurality of mobile stations, referred as user equipments (UEs).

Enhancements to LTE systems are considered so that they can meet or exceed International Mobile Telecommunications Advanced (IMT-Advanced) fourth generation (4G) standard. One of the key enhancements is to support bandwidth up to 100 MHz and be backwards compatible with the existing wireless network system. Carrier aggregation (CA) is introduced to improve the system throughput. With carrier aggregation, the LTE-Advance system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers.

In a mobile network, the bandwidth requirement of each UE changes with the amount of data the UE is transmitting and receiving. In LTE systems, an eNB may dynamically allocate resources among UEs. Carrier aggregation allows the mobile network to use the bandwidth more efficiently. However, it also increases the complexity of resource management. A light-weighted component-carrier management scheme is thus desirable. One of the issues is how to efficiently activate or deactivate one or more component carriers on a UE. One scenario is upon receiving CC activation/deactivation messages from an eNB, a UE needs to efficiently analyze the messages and make decisions to trigger actions. In other scenarios, the UE can decide to activate a plurality of CCs or deactivate a plurality of CCs based on an internal timer, or a combination of internal CC states and a received CC activation/deactivation message from an eNB.

To make the system more efficient, carrier aggregation also requires changes in scheduling mechanisms, including Buffer Status Report (BSR) and Power Headroom Report (PHR). The BSR procedure provides the serving eNB with information about the amount of data available for transmission in the UL buffers of the UE. It is performed in the medium access control (MAC) layer between the UE and the eNB. When the BSR is triggered at a transmission time interval (TTI), a BSR control element is included in a medium access control-packet data unit (MAC-PDU), or a transport block (TB), to be delivered to the eNB. There are several BSR triggers. A set of events can trigger a regular BSR. When BSR timer expires, it triggers a periodic BSR. A padding BSR is triggered only when there is enough padding bit. CA imposes a question of how to prepare the BSR when all UE grants from all CCs in one TTI are considered. Another scheduling mechanism is PHR. A UE uses the PHR procedure to provide the serving eNB with a power offset between a maximum transmitting power of the UE and a current transmitting power of the UE. With multiple CCs configured and dynamic activation and deactivation for each CC, it is important to consider the impact for the PHR during these CA procedures.

Carrier aggregation also provides new ways to link DL and UL. Without CA configured, each DL CC broadcast a UL CC in System Information Block 2 (SIB2). This is a cell specific UL CC where a UE finds its Physical Radio Access Channel (PRACH) resource and transmits Packet Uplink Control Channel (PUCCH) and Physical Uplink Shared Channel (PUSCH). The network cells all possess this cell specific linking. Since SIB2 linking almost never changes, it can be called static linking. With CA, multiple UL CCs can be configured to a UE. Therefore, besides the static SIB2 linking, new types of DL-UL linking are created.

SUMMARY

Methods to manage multiple component carriers (CCs) efficiently in a mobile network with carrier aggregation (CA) enabled are proposed.

For CC activation and/or deactivation, a single LCID value is used by an eNB to represent both activation and deactivation command for a user equipment (UE). A single command with multiple instructions is provided to activate and/or deactivate multiple CCs. In one embodiment, the command is contained in a media access control (MAC) control element (CE) having a bitmap format, and each bit is associated with an activation or deactivation instruction for a corresponding CE. In addition, unnecessary re-activation or re-inactivation of a CC is prevented, and explicit feedback for activation and or deactivation is considered.

For scheduling mechanism, a novel buffer status reporting (BSR) procedure of a UE is provided, where only one BSR is calculated after preparing all the transport blocks (TB) within one transmission time interval (TTI) with multiple uplink grants. This ensures that BSR always reports the lasted updated buffer status. Novel power headroom reporting (PHR) format and PHR trigger of a UE are also provided. In one embodiment, carrier indicator field (CIF) is added in the PHR MAC CE to be used as a bitmap for configured CC. Furthermore, when a secondary cell (Scell) of the UE is configured and activated, it is beneficial to trigger the UE to report PHR to the serving eNB the available transmission power.

For DL-UL linking, various linking types are created based on whether there is carrier indicator field (CIF) in DL grant or UL grant. In a first embodiment, dynamic DL-UL linking is created by a UL grant with CIF. In a second embodiment, DL semi-static linking is created by a DL grant with CIF. In a third embodiment, DL semi-static linking is created by a DL grant without CIF. In a fourth embodiment, a UL semi-static linking is created by a UL grant without CIF. The various linking types are used in different applications to improve scheduling flexibility and load balancing. The different applications include physical random access channel (PRACH), power control, pathloss reference, timing reference, CC management and CC addition and/or removal. In addition, system information is prepared and transmitted by an eNB via dedicated signaling for configuring an SCC of a UE. In one embodiment, the system information via dedicated signaling may be different from the system information via broadcast signaling.

BRIEF DESCRIPTION OF THE DRAWINGS

The accompanying drawings, where like numerals indicate like components, illustrate embodiments of the invention.

FIG. 6A illustrates a CC activation process.

FIG. 6B illustrates a CC deactivation process.

DETAILED DESCRIPTION

Reference will now be made in detail to some embodiments of the invention, examples of which are illustrated in the accompanying drawings.

Figure 1:
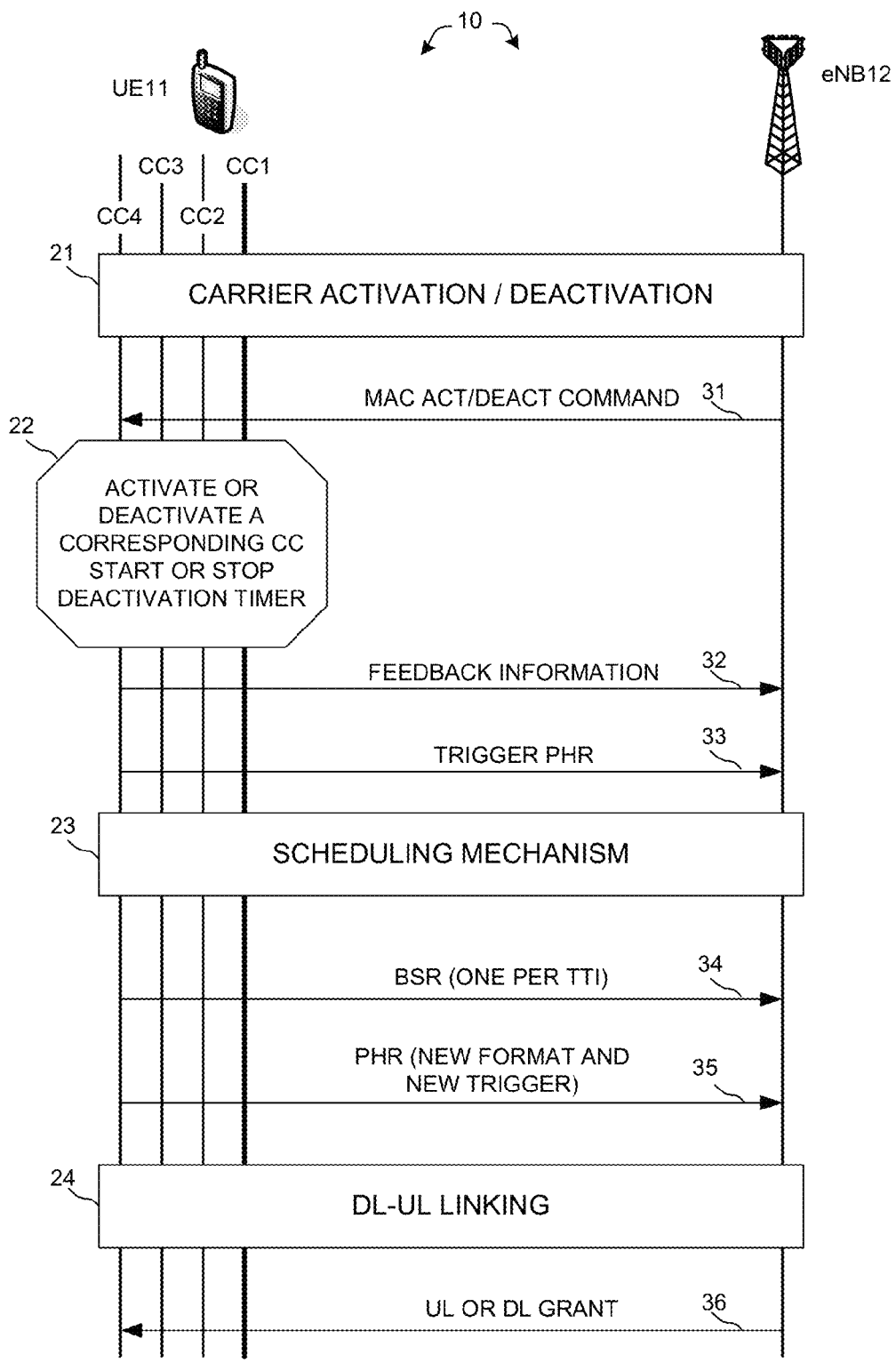
FIG. 1 illustrates methods to manage multiple CCs efficiently in a mobile network with CA enabled.

FIG. 1 illustrates methods to manage multiple component carriers (CCs) efficiently in a mobile network 10 with carrier aggregation (CA) enabled. Mobile network system 10 comprises a plurality of evolved Node-Bs (e.g., eNB 12) and user equipments (e.g., UE 11). At Process 21, a plurality of CCs (e.g., CC1-CC4) are activated/deactivated. eNB 12 communicates with UE 11 at the MAC layer to instruct UE 11 to activate/deactivate corresponding CCs via message 31. Upon receiving such command, UE 11 processes the command and starts the CC activation/deactivation Process 22. UE 11 analyzes the command and takes actions to activate/deactivate corresponding CCs and start deactivation timer when needed. Upon finishing activation/deactivation of one or more CCs, UE 11 sends feedback message 32 to eNB 12. If a new Secondary Cell (SCell) is activated, UE 11 triggers the power headroom reporting (PHR) to be sent to eNB 12 via message 33. Scheduling Mechanism 23 enhances efficiency for CA enabled network. In one embodiment, buffer status reporting (BSR) message 34 is built considering there could be multiple uplink (UL) grants during one Transmission Time Interval (TTI). Therefore, UE 11 builds message 34 of regular or periodic BSR considering all transport blocks (TBs) of each TTI. Improvements also includes new PHR format, as shown in message 35, and new PHR triggers. New types of DL-UL linking are introduced in Process 24, including dynamic linking, DL semi-static linking and UL semi-static linking followed by an UL or DL grant via message 36. The following descriptions detail methods in the CC Activation/Deactivation Process, Scheduling Mechanisms, and DL-UL linking for a CA enabled system.

CC Activation/Deactivation

Figure 2:
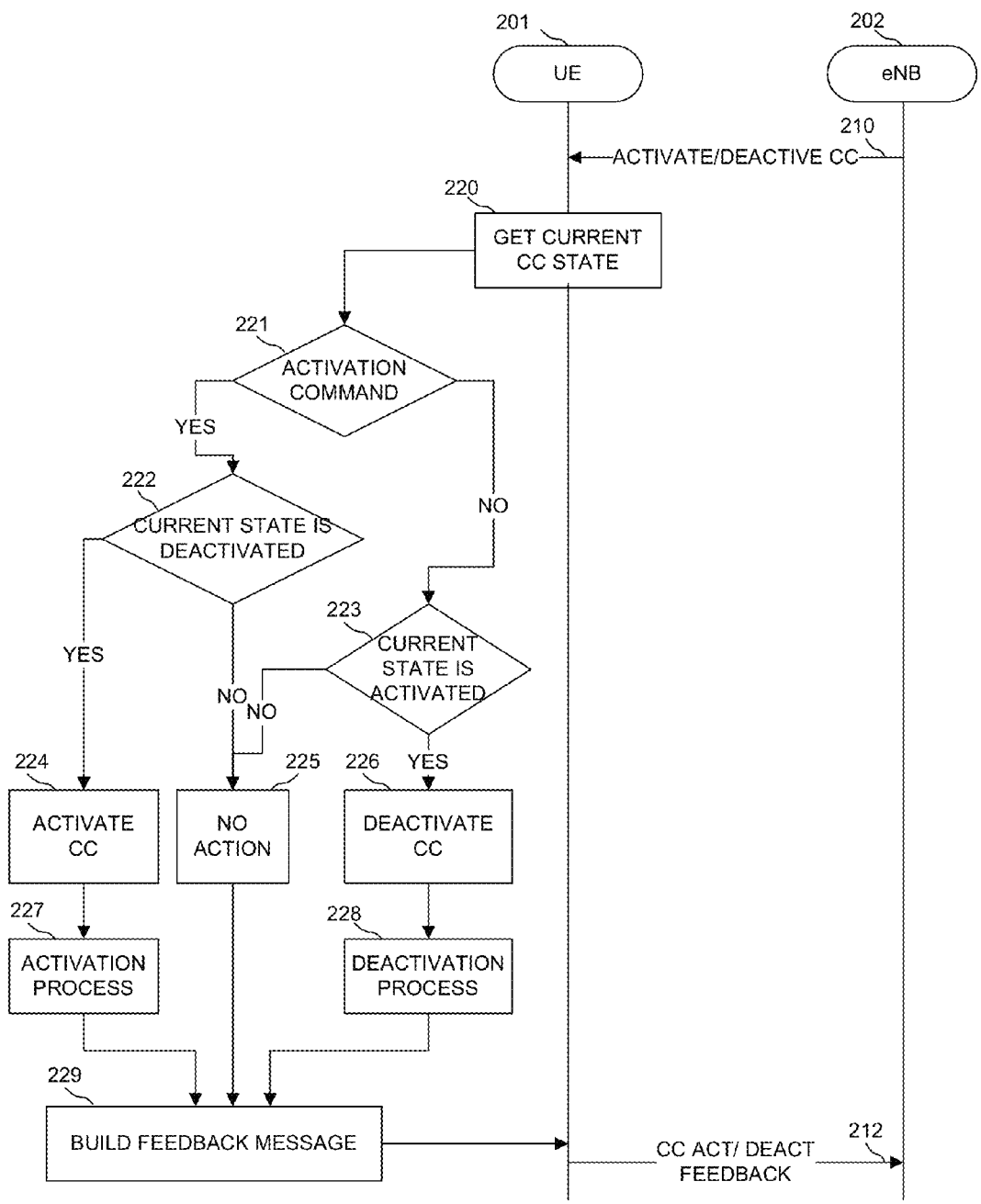
FIG. 2 illustrates an operation flow of a component carrier activation/deactivation procedure between a base station eNB and a mobile station UE in a carrier aggregation mobile network.

FIG. 2 illustrates an operation flow of a CC activation/deactivation procedure between a base station eNB 202 and a mobile station UE 201 in a carrier aggregation mobile network. eNB 202 can dynamically activate/deactivate a plurality of CCs of UE 201 by sending a message 210 of CC activate/deactivate message. In one novel aspect, UE 201 analyzes message 210 and makes decisions to trigger actions. UE 201 gets the current state of activated or deactivated of each CC at step 220. At step 221, UE 201 analyzes message 210 and each CC's current state to decide whether this is an activation command for each CC. If it is an activation command for a specific CC, at step 222, UE 201 checks the state of this particular CC. If the state of the CC that receives an activation command is deactivated, at step 224, UE 201 will activate the CC and trigger activation process at step 227. Similarly, if at step 221 UE 201 finds that it is not an activation command for a specific CC, at step 223, UE 201 checks the state of this particular CC. If the state of the CC that receives a deactivation command is activated, at step 226, UE 201 will deactivate the CC and trigger deactivation process at step 228.

In one advantageous aspect, UE 201 will not trigger a re-activation or re-deactivation procedure. As illustrated in FIG. 2, if an activation command is received for an activated CC or a deactivation command is received for a deactivated CC, at step 225, there will be no action. In another advantageous aspect, a UE sends an explicit feedback message for CC activation/deactivation to the serving eNB. The feedback message can be a Layer 1 signaling, like a scheduling request (SR) or HARQ feedback; or it can be a MAC Control Element (MAC-CE). Alternatively, the UE can initiate a Random Access (RA) procedure on a certain CC to inform eNB the activation/deactivation status of the CC. Considering the front-end retuning time could be a variable depends on UE capacity, it is thus very important for the eNB to know when the UE has finished the retuning and is ready for reception or transmission. As illustrated in FIG. 2, after step 227 activation process or step 228 deactivation process, UE 201 will build an explicit feedback message at step 229. UE 201 sends the CC activation/deactivation feedback message 212 to eNB 202. Message 212 informs the serving eNB that the UE is ready to receive or transmit for the specific CCs. By taking no re-activation or re-deactivation actions, and by sending explicit feedback messages to the eNB, CC management efficiency is improved.

Another important aspect of increasing CC management efficiency involves the format of the CC activation/deactivation message from the serving eNB. Since a UE supports activation or deactivation of multiple CCs simultaneously, it is most efficient to carry multiple instructions for the configured CCs in one command message. The Logic Channel ID field (LCID) in a MAC-PDU can be used to carry the CC activation/deactivation command. The question remains whether to use a single LCID value for both activation and deactivation or to use two distinct LCID values to represent activation and deactivation separately.

In one novel aspect, it is preferred to use a single LCID value to represent both the activation and deactivation command. A bitmap carrying the complete information of the after-command CC state is also included. UE upon receiving this message will compare the CC state in the CC activation/deactivation command message with the current state of corresponding CC to decide whether this is activation or deactivation command.

Figure 3:
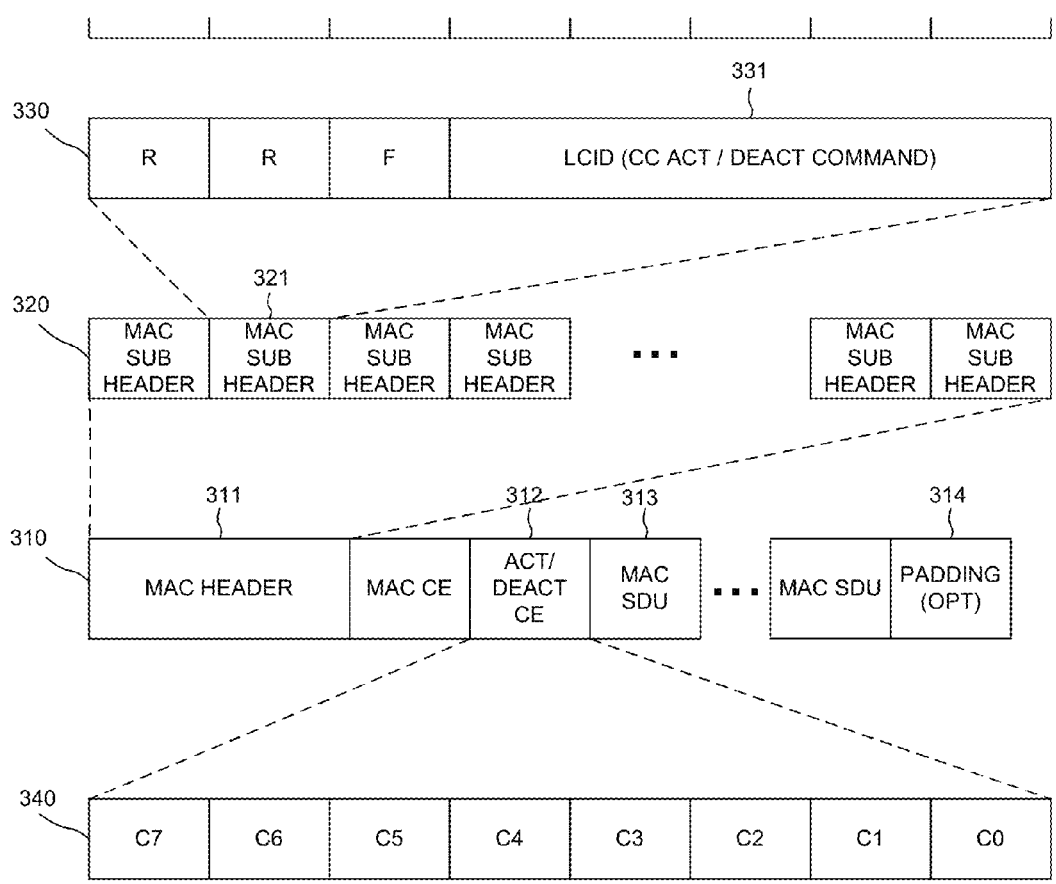
FIG. 3 illustrates a configuration diagram of a MAC-PDU according to an embodiment of the present invention.

FIG. 3 is a block diagram illustrating the configuration of a MAC-PDU according to an embodiment of the present invention. Referring to FIG. 3, the MAC-PDU 310 includes MAC Header 311, MAC Control Element (MAC CE), specifically ACT/DEACT CE 312, multiple MAC-SDU 313, and optional padding 314. MAC header 311 comprises a plurality of MAC sub header 320. Each MAC sub header takes a specific format, such as MAC sub header 321. In one embodiment of the invention, the CC activation/deactivation command uses the specific format of MAC sub header 330, where the value of LCID 331 indicates command type being CC activation/deactivation. In one embodiment of the invention, a bitmap of the state of CCs is presented in the ACT/DEACT CE 312. It has been agreed that LTE should support aggregation of up to 5 DL CCs, however, it is expected to support 8 CCs in the future. Therefore, an 8-bit MAC-CE field is used as a bitmap to represent the CC states. Block 340 illustrates the format of this ACT/DEACT CE 312. One or more of bits C0 to C7 represents a state for a corresponding CC.

Figure 4:
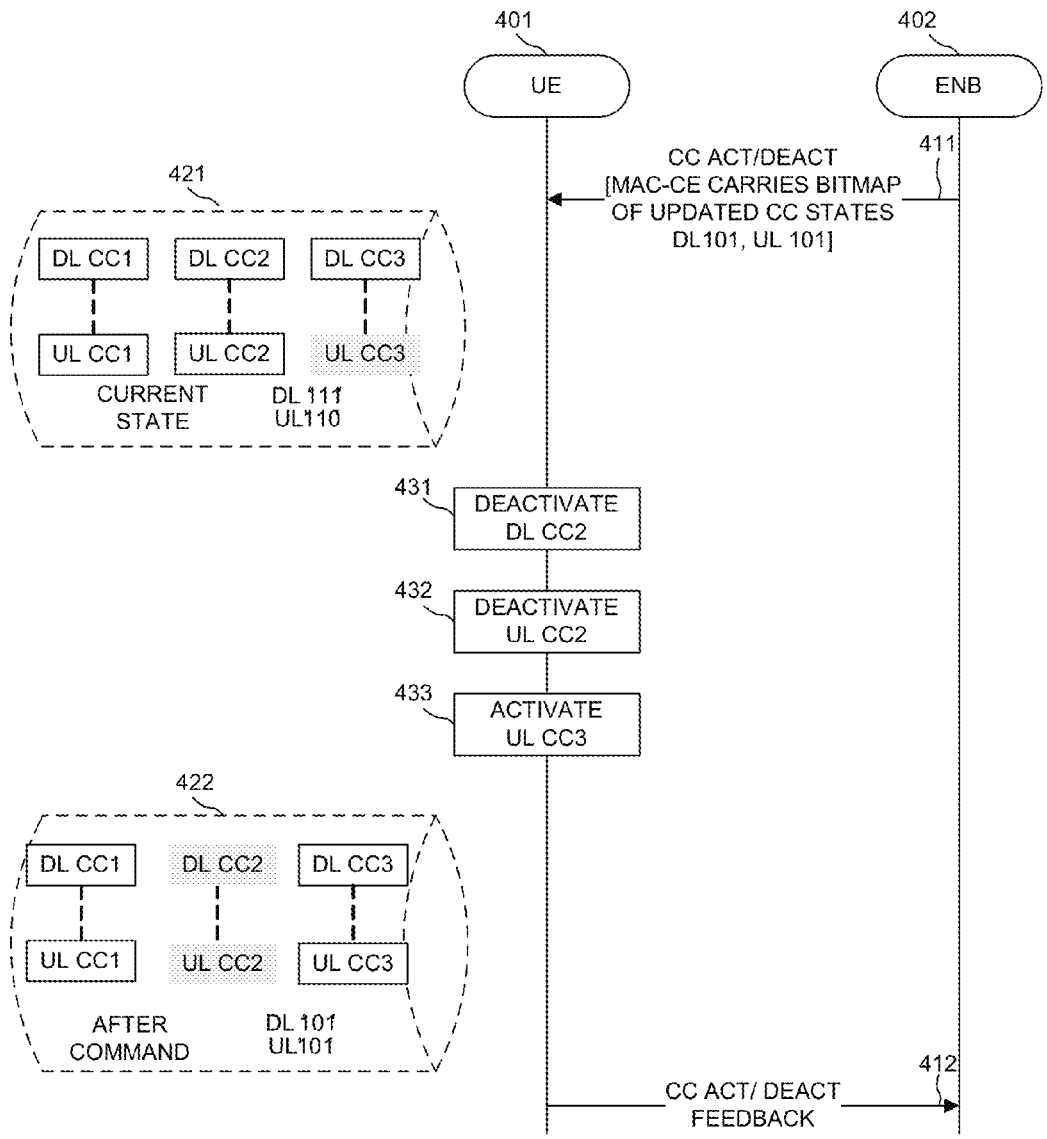
FIG. 4 illustrates a specific example of CC activation/deactivation using MAC Control Element as CC state bitmap.

FIG. 4 illustrates a specific example of CC activation/deactivation using MAC-CE as CC state bitmap. eNB 402 sends a CC Activation/Deactivation message command 411, as illustrated in FIG. 4, with the bitmap of the CC state in the MAC-CE. Block 421 shows the current state of all the CCs in UE 401. DL-C 1, UL-CC1, DL-CC2, UL-CC2, and DL-CC3 are all in activated state, while UL-CC3 is in deactivated state. The MAC-CE bitmap in message command 411 represents an after-command bitmap of DL '101' and UL '101', where '1' represents the activated state and '0' represents the deactivated state. Each bit in the bitmap thus is associated with an activation or deactivation instruction. Upon receiving message command 411, UE 401 compares the CE bitmap with its current CC state. It determines that since DL-CC2 and UL-CC2's current states are activated and the CE bitmap indicates DL-CC2 and UL-CC2 being deactivate, the message command 411 indicates a deactivation instruction for DL-CC2 and UL-CC2. At steps 431 and 432, UE 401 deactivates DL-CC2 and UL-CC2 respectively. Similarly, since 411 CE bitmap indicates activated state for UL-CC3 and UL-CC3's current state is deactivated, UE 401 activates UL-CC3 at step 433. CC Activation/Deactivation feedback message 412 is sent to eNB 402. Block 422 shows the after-command CC states in UE 401, where DL-CC1, UL-CC1, DL-CC3 and UL-CC3 are in activated states, while DL-CC2 and UL-CC2 are in deactivated states.

Figure 5:
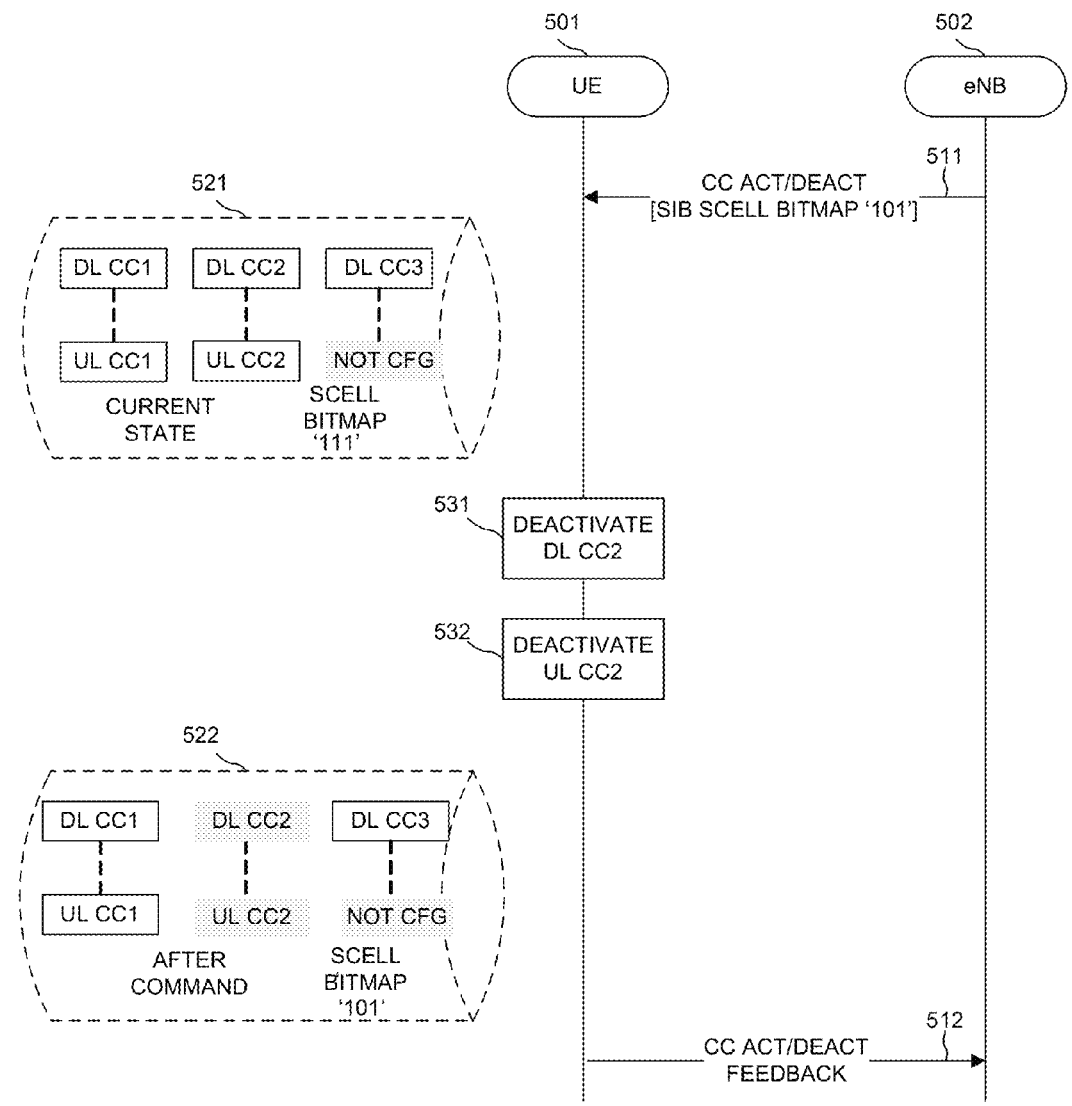
FIG. 5 illustrates a specific example of CC activation/deactivation using SIB as CC state bitmap.

In another embodiment of CC activation/deactivation, a System Information Block (SIB) linking is used. In this embodiment, the DL/UL state are synced and only one ACT/DEACT command for one CC is applied. FIG. 5 illustrates a specific example of CC activation/deactivation using SIB as CC state bitmap. eNB 502 sends a CC Activation/Deactivation message command 511, with the bitmap of the CC state in the SIB, to UE 501. Block 521 shows the current state of all the CCs in UE 501. DL-CC1, UL-CC1, DL-CC2, UL-CC2, and DL-CC3 are all in activated state, while UL-CC3 is not configured. The SIB bitmap in message command 511 representing an after-command bit map of Secondary Cell (SCell) '101', where '1' represents the activated SCell state and '0' represents the deactivated SCell state. Upon receiving message command 511, UE 501 compares the SIB bitmap with its current CC state. It determines that since DL-CC2 and UL-CC2's current states are activated and the SIB bitmap indicates SCell 2 being deactivate, the message command 511 indicates a deactivation trigger for DL and UL of SCell 2, which are UL-CC2 and DL-CC2. At steps 531 and 532, UE 501 deactivates DL-CC2 and UL-CC2 respectively. Similarly, since 511 SIB bitmaps indicates activated state for SCell 3 and UL-CC3's current state is not configured, and DL-CC3 is activated, UE 501 will take no action for SCell 3. CC Activation/Deactivation feedback message 512 is sent to eNB 502. Block 522 shows the after-command CC states in UE 501, where DL-CC1, UL-CC1, and DL-CC3 are in activated states; DL-CC2 and UL-CC2 are in deactivated states; and UL-CC3 is not configured.

Using one single command to activate/deactivate multiple CCs is an efficient way to manage the resources in a carrier aggregation system. As illustrated in FIG. 2, specific procedures are needed at UE upon activation or deactivation of CC. Specifically, steps 227 and 228 addresses unique issues presented in the carrier aggregation that is not seen in a traditional mobile network.

FIG. 6A illustrates a CC activation process. Process 227 in FIG. 6A starts when a CC is activated (step 610). Upon activation of a CC, a UE will activate the SCell before the time required by retuning time (step 611); start the deactivation timer for this SCell (step 612); send channel state information (CSI) such as CQI/PMI/RI report if they are configured (If the CSI is not available, a special value shall be transmitted) (step 613); transmit SRS if configured (step 614); and Trigger PHR process (step 615). In one novel aspect, a new PHR trigger is added upon activation of the SCell. It is beneficial to report PHR to inform the eNB about the available UE transmission power as soon as the SCell is configured and activated. The reason of still transmitting CSI report when it is not available after activation is to simplify the blind decoding burden of eNB.

FIG. 6B illustrates a CC deactivation process. Process 228 in FIG. 6B starts when a CC is deactivated or the deactivation timer expired (step 620). Upon deactivation of a CC, a UE will deactivate the SCell before the time required by retuning time (step 621); stop the deactivation timer for this SCell (step 622); not stop CQI/PMI/RI reporting until retuning timer is expired (step 623); stop SRS transmission (step 624); and flush all Hybrid ARQ (HARQ) buffers associated with the SCell (step 625). The reason of not stopping CSI report before retuning timer is expired is to simplify the blind decoding burden of eNB.

As illustrated in the activation and deactivation process, a deactivation timer is used to implicitly deactivate a SCell. Explicit activation/deactivation should be the preferred way for eNB to perform CC activation/deactivation, since it ensures the highest level of common understanding on the active CC set between eNB and UE. However, implicit deactivation of configured SCells is a safety mechanism in case the network does not explicitly deactivate the SCell or the deactivation command was lost. A deactivation timer is configured for each Secondary CC (SCC) to do implicit deactivation. The timer is configured when the UE enters the CA mode. In one embodiment, the value of the timer is UE specific, i.e. each SCell is configured with a deactivation timer but they all share the same initial value. When the deactivation timer of an activated DL SCC expires, the UE would locally deactivate the SCell.

Figure 7:
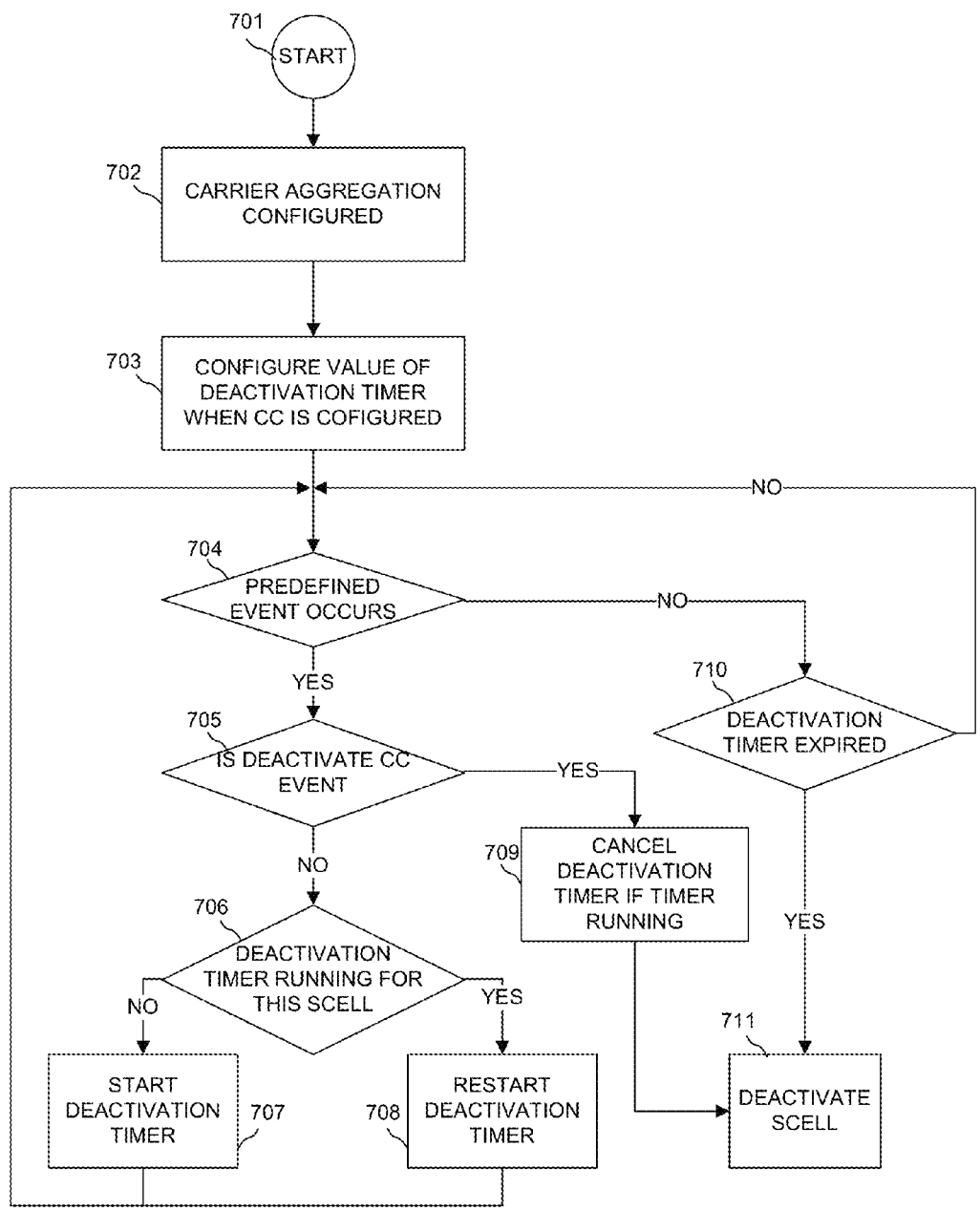
FIG. 7 illustrates one embodiment of implicit component carrier deactivation by using a deactivation timer.

FIG. 7 illustrates one embodiment of implicit CC deactivation by using a deactivation timer. The process starts at step 701. Upon CA configuration at step 702, the UE configures the value of the deactivation timer at step 703. The UE, at step 704, then checks if there is any predefined event occurs. If there is such event occurs, the UE checks if this is a deactivate CC event at step 705. If it is, the UE executes step 709 to cancel the deactivate timer if it is running; and deactivates the SCell at step 711. If at step 705 the UE determines that the event is not deactivation event, it then checks if the deactivation timer is running for this SCell at step 706. If the timer is running, it restarts the deactivation timer at step 708. If the timer is not running, it starts the deactivation timer at step 707. After starting or restarting the deactivation timer at steps 707 or 708, the UE goes back to the waiting mode to check if any predefined event occurs at step 704. If no predefined event occurs before the deactivation timer expires at step 710, the UE will deactivate the SCell in step 711 based on the expiration of the deactivation timer.

There are a set of predefined events for triggering the deactivation timer. The predefined events may include but are not limited to: a SCell is activated; a physical downlink control channel (PDCCH) DL assignment is received on the SCell; a PDCCH UL grant is received on the SCell, if UL CC is configured; a PDCCH DL assignment is received on the scheduling cell for the SCell; a PDCCH UL grant is received on the scheduling cell for the SCell, if UL CC is configured; a configured physical downlink or uplink shared channel (PDSCH/PUSCH) transmission takes place on the SCell, if SPS is supported on the CC; and an activation/deactivation command is received.

Scheduling Mechanism

As detailed above, the set of light-weighted CC activation and deactivation methods can improve the efficiency of carrier management in a carrier aggregation based mobile system. Further consideration is given to scheduling mechanisms with carrier aggregation.

In one novel aspect, an updated BSR procedure can avoid the problem of reporting a buffer status in the BSR that did not count all UL grants from all the CCs in one TTI. Because CA is within the same eNB, for system efficiency, it is unnecessary to prepare multiple BSRs within one TTI even with more than one UL grants from different CCs within one TTI. Only one TB should include a regular or a periodic BSR. However, if only one regular or periodic BSR is reported, the current BSR scheme may result in BSR not reflecting the updated UL grant.

Figure 9A:
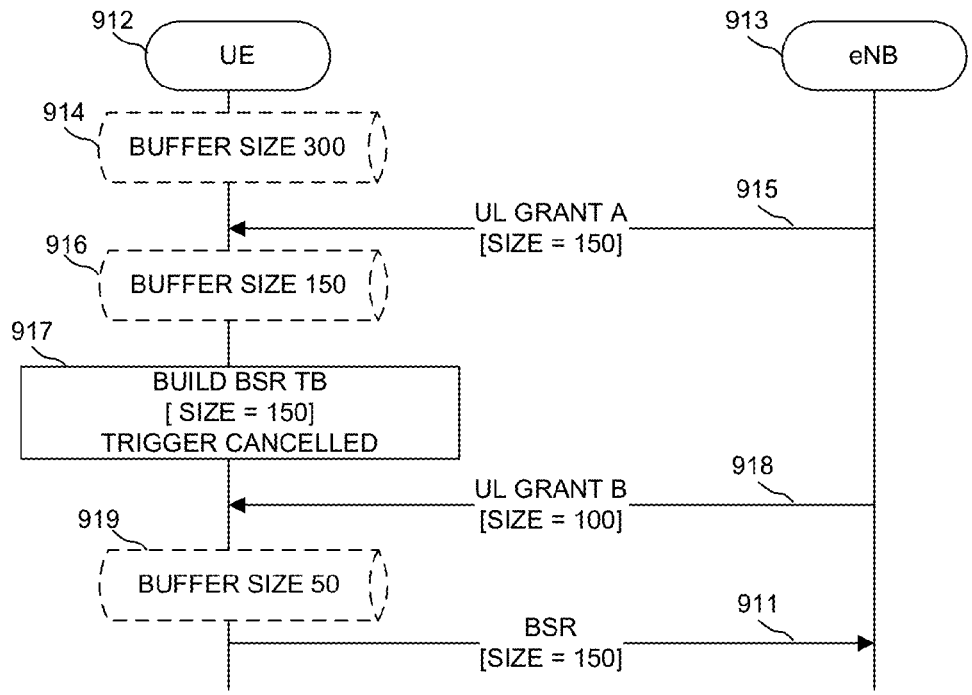
FIG. 9A illustrates a specific example of a BSR procedure that results in an obsolete buffer size.

FIG. 9A illustrates a specific example of a current BSR procedure that results in an obsolete buffer status. UE 912 has a buffer size of 300, shown in Block 914. At step 915, eNB 913 sends UE 912 an UL grant A with size of 150. Therefore, at step 916, the buffer size of UE 912 becomes 150 (block 916). This triggers a BSR, and therefore, a buffer status of 150 is built for the TB. Since there should be one BSR per TTI, the BSR trigger is cancelled. In a CA system, at step 918, eNB 913 can send another UL Grant B, with the size of 100. Therefore, at step 919, UE 912's actual buffer status is 50. However, the BSR sent via message 911, which was built before the last TB, still carries a size of 150. Therefore, BSR message 911 does not reflect the most recent buffer status of UE 912.

To solve this problem, in one novel aspect, it is proposed to only consider BSR when preparing the last TB if there is more one TB in a TTI so that the BSR would take into account all the grants in the current TTI. Padding BSR is triggered only when there is enough padding bit for including a BSR. If the existing BSR mechanism is reused, the trigger works on a per TB basis. Therefore, it is possible that more than one padding BSR is included on different TBs for a TTI.

Figure 8:
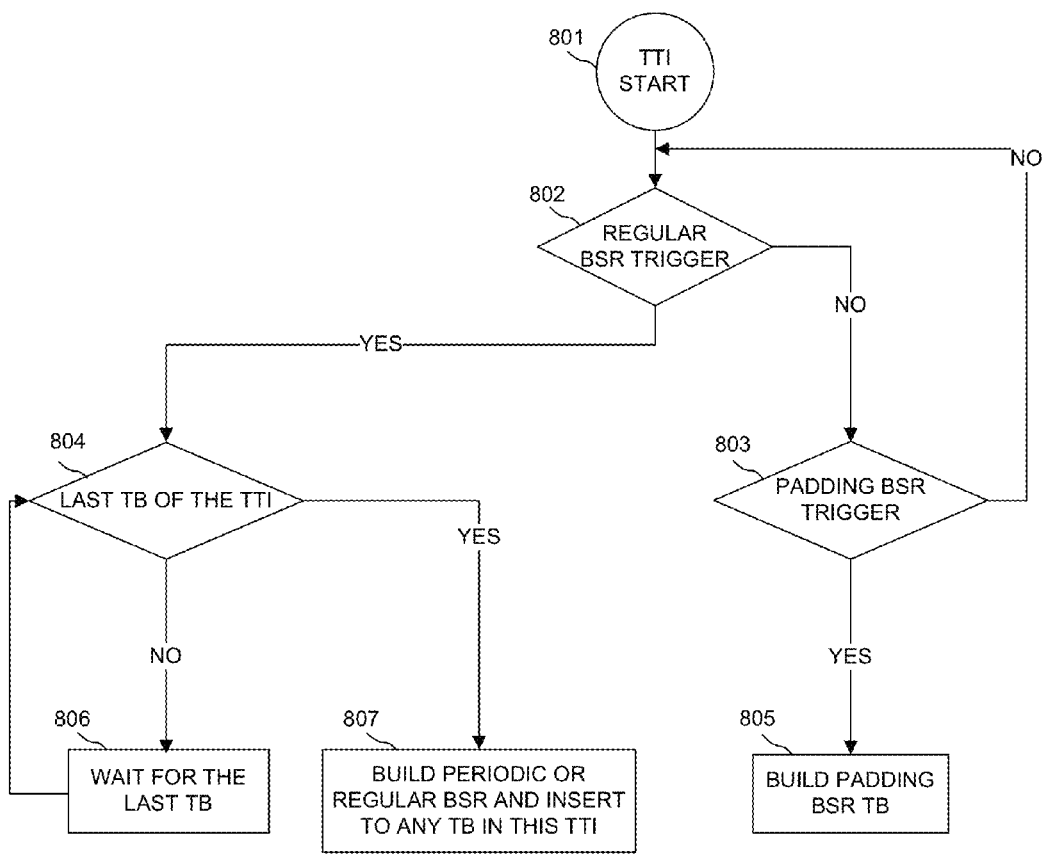
FIG. 8 illustrates one embodiment of a BSR procedure.

FIG. 8 illustrates one embodiment of such novel BSR procedure. TTI starts at step 801. The UE keeps tracking if there is BSR Trigger occurs at step 802. If a Regular BSR trigger exists, at step 804, it is determined whether this is the last TB for this TTI. If it is not the last TB, UE will wait for the last TB at step 806. If it is the last TB of the TTI, UE will build the BSR at step 807, the BSR can be inserted to any TB in this TTI. For each TB, at step 803 the UE checks if a Regular BSR is inserted and whether there is room for padding BSR. Padding BSR is triggered when there is room and no Regular BSR in the TB, UE continues with building the padding BSR for this TB at step 805.

Figure 9B:
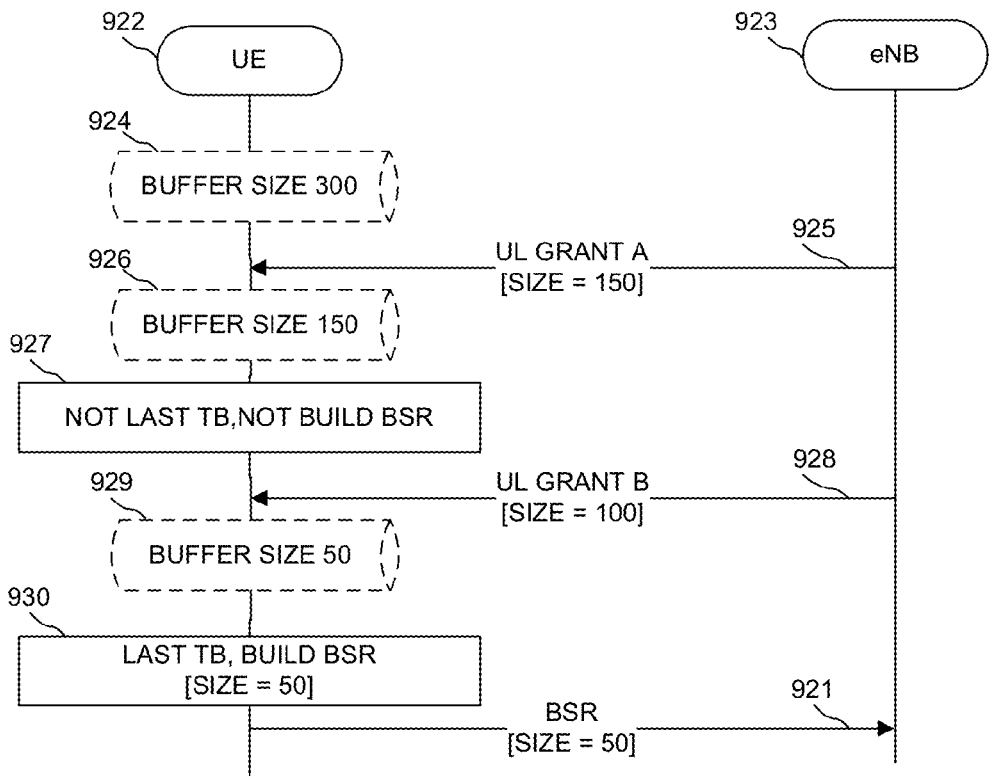
FIG. 9B illustrates a specific example of an embodiment of the BSR procedure.

This method ensures that BSR reports the latest updated buffer status considering all grants from each CC. FIG. 9B illustrates specific examples of such embodiment of the novel BSR procedure. Similar to FIG. 9A, UE 922 has a buffer size of 300 (block 924). At step 925, eNB 923 send UE 922 an UL grant A with size of 150. Therefore, at step 926, the buffer size of UE 922 becomes 150 (block 926). This triggers a BSR. In the novel BSR procedure, UE checks if this is the last TB. Since it is not, no BSR is built for this TB. UE keeps checking when the last TB for this TTI will be build. In a CA system, at step 928, eNB 923 can send another UL Grant B, with the size of 100. Therefore, at step 929, the actual UE 922's buffer status is 50. When building the last TB at step 930, the BSR is built, with the buffer status of 50. UE 922 then included the correct buffer status in the BSR message 921, which is sent to eNB 923.

PHR is another scheduling mechanism. In a CA enabled system, there can be multiple UL grants. Therefore, a PHR transmitting on a specific UL CC is not necessary the PHR for this particular transmitting UL CC. Without explicit indication, an eNB cannot know which UL CC triggered the PHR. Therefore, PHR MAC CE in one TB needs to be updated to include multiple PHRs and carrier index information for each PHR.

Figure 10:
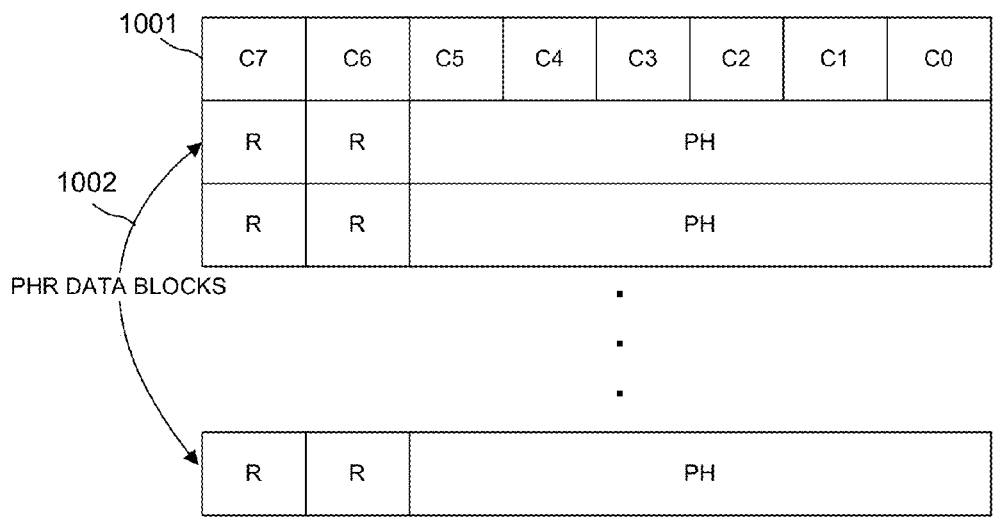
FIG. 10 illustrates an updated PHR MAC CE format.

FIG. 10 illustrates an updated PHR MAC CE. In one novel aspect, Carrier Indicator Field (CIF) is added in the PHR MAC CE to be used as a bitmap for configured CC. Block 1001 shows such bitmap. One or more of bits C0 to C7 in 1001 represent one configured CC. The value of each bit indicates whether the corresponding CC's PHR is included. Block 1002 in FIG. 10 represents multiple PHR data blocks. These data blocks can take in any format that contains the PHR information for each CC.

There are several radio resource control (RRC) parameters associate with the PHR procedure. Periodic PHR-Timer, prohibitPHR-Timer, and dlPathlossChang are some of the examples. These parameters associate with a particular CC. In one embodiment, all UL CC shares the same set of value for these RRC parameters. Simultaneous transmission of PUCCH and PUSCH is also possible in a mobile network. In one embodiment independent PHR for PUCCH and PUSCH are sent in such scenario. PUCCH PHR can be reported with PUSCH PHR for the Primary Cell (PCell). Furthermore, as illustrated above with regard to carrier activation, when a Scell of a UE is configured and activated, it is beneficial to trigger the UE to report PHR to the serving eNB the available transmission power.

UL-DL Linking

Besides light-weighted CC management methods, new types of UL-DL linking can further improve the efficiency of the system by providing more flexibility in scheduling as well as load balancing. Without CA, the traditional mobile network uses SIB2 static linking. With the introduction of CA, new types of DL-UL linking are created based on whether there is CIF in UL grant or DL grant. There are four cases: UL grant with CIF, DL grant with CIF, UL grant without CIF and DL grant without CIF. Further, since CC can be activated and deactivated, procedures are needed to update the DL-UL linking upon CC activation/deactivation.

Dynamic DL-UL linking can be created by UL grant with CIF. Cross-carrier scheduling in the UE specific search space should always be supported by explicit CIF. For a UL grant, Physical Hybrid ARQ Indicator Channel (PHICH) is transmitted only on the DL CC that was used to transmit the UL grant. Therefore, a new DL-UL linking is defined for a cross-carrier UL grant. Such linking, called as Dynamic Linking, is grant specific and lasts for the life cycle of this UL grant.

Figure 11:
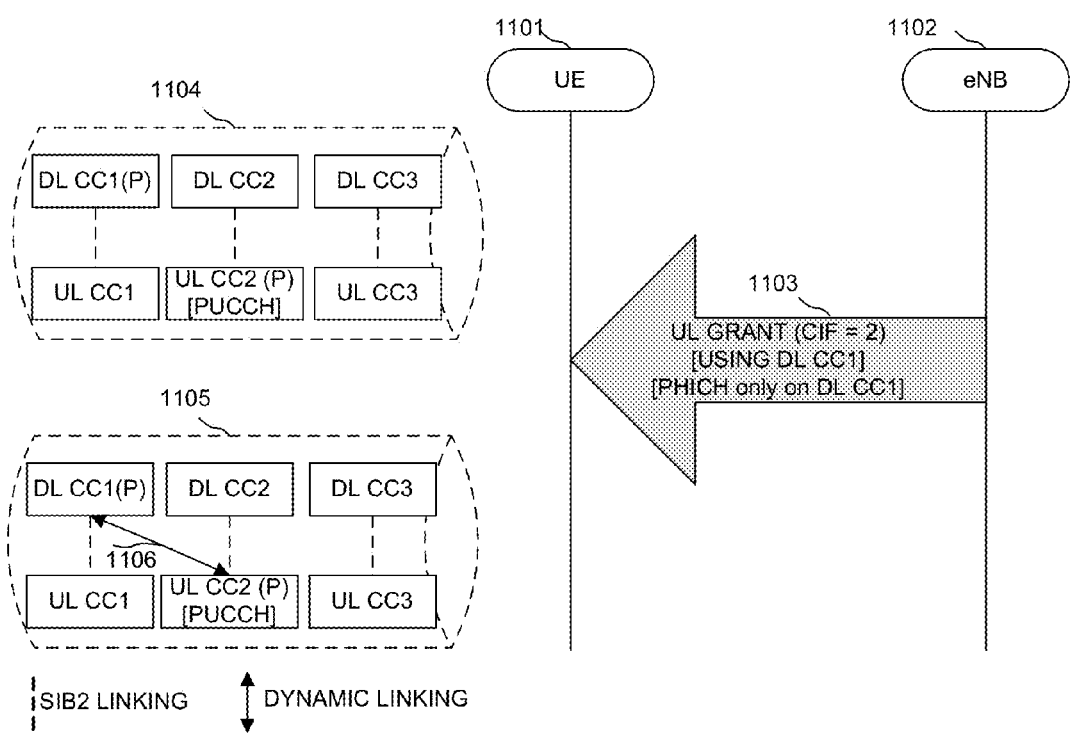
FIG. 11 illustrates a specific example of a dynamic DL-UL linking created by UL grant with Carrier Indication Field (CIF).

FIG. 11 illustrates a specific example of a dynamic DL-UL linking created by UL grant with CIF. UE 1101 has statically linked UL-DL as shown in Block 1104, where DL CC1 and UL CC2 are the Primary CCs (PCCs) and UL CC2 is the PUCCH. At Step 1103, eNB 1102 transmits a UL grant with CIF=2 using DL CC1. PHICH is only transmitted on DL CC1. As a result of this UL grant with CIF at step 1103, a UL-DL dynamic link is created as shown in Block 1105. Where dynamic linking 1106 links DL CC1 and UL CC2. Link 1106 is 1103 UL grant specific and lasts only for the life cycle of 1103 UL grant.

Figure 12:
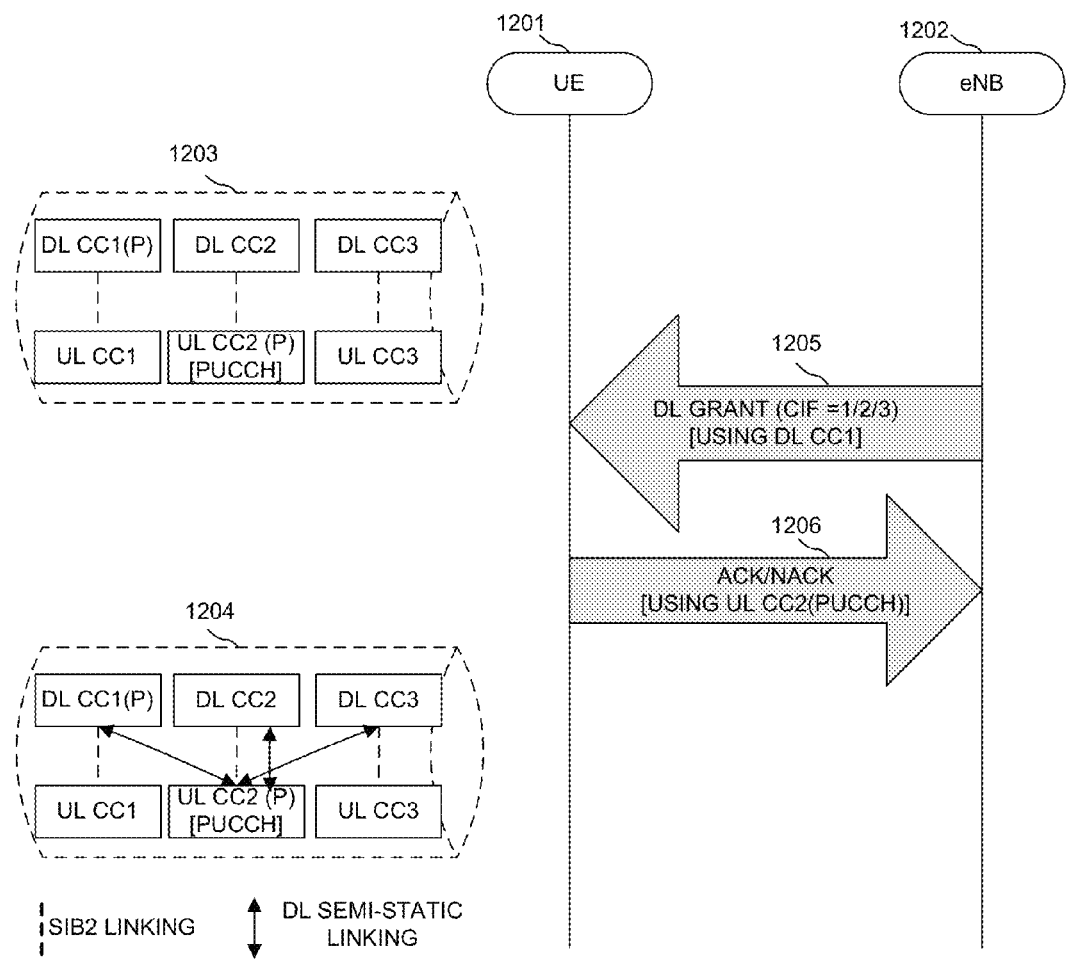
FIG. 12 illustrates a specific example of a DL semi-static linking created by a DL grant with CIF.

A second type of new DL-UL linking is DL Semi-Static Linking, which can be created by a DL Grant, this DL Grant can have CIF or not. In a DL grant, a UE has to reply ACK/NACK on the PUCCH. There is only one UE specific PUCCH, which is configured on one of the UL CCs. As shown in FIG. 12 Block 1203, UL CC2 is configured to be PUCCH for UE 1201. In one embodiment of the present invention, the PUCCH UL CC is the UL PCC, as shown in FIG. 12, where UL CC2 is the UL PCC. With this DL grant, the PUCCH is semi-statically configured to the UE and is linked with the DL grant CC or CCs. This new linking is called DL Semi-Static Linking. For semi-static linking of a DL grant with CIF, all the DL CCs are linked to UL PCC, which contains PUCCH.

FIG. 12 illustrates a specific example of a DL semi-static linking created by a DL grant with CIF. UE 1201 has statically linked CCs as shown in Block 1203. At step 1205, eNB 1202 transmits a DL grant with CIF=1/2/3 using DL CC1. Upon receiving this DL Grant, UE 1201 sends back ACK/NACK using the configured PUCCH, which is UL CC2 as shown in Block 1203 and 1204. Therefore, an N to 1 DL semi-static linking is created with UL CC2 linking to DL CC1, DL CC2 and DL CC3.

Figure 13:
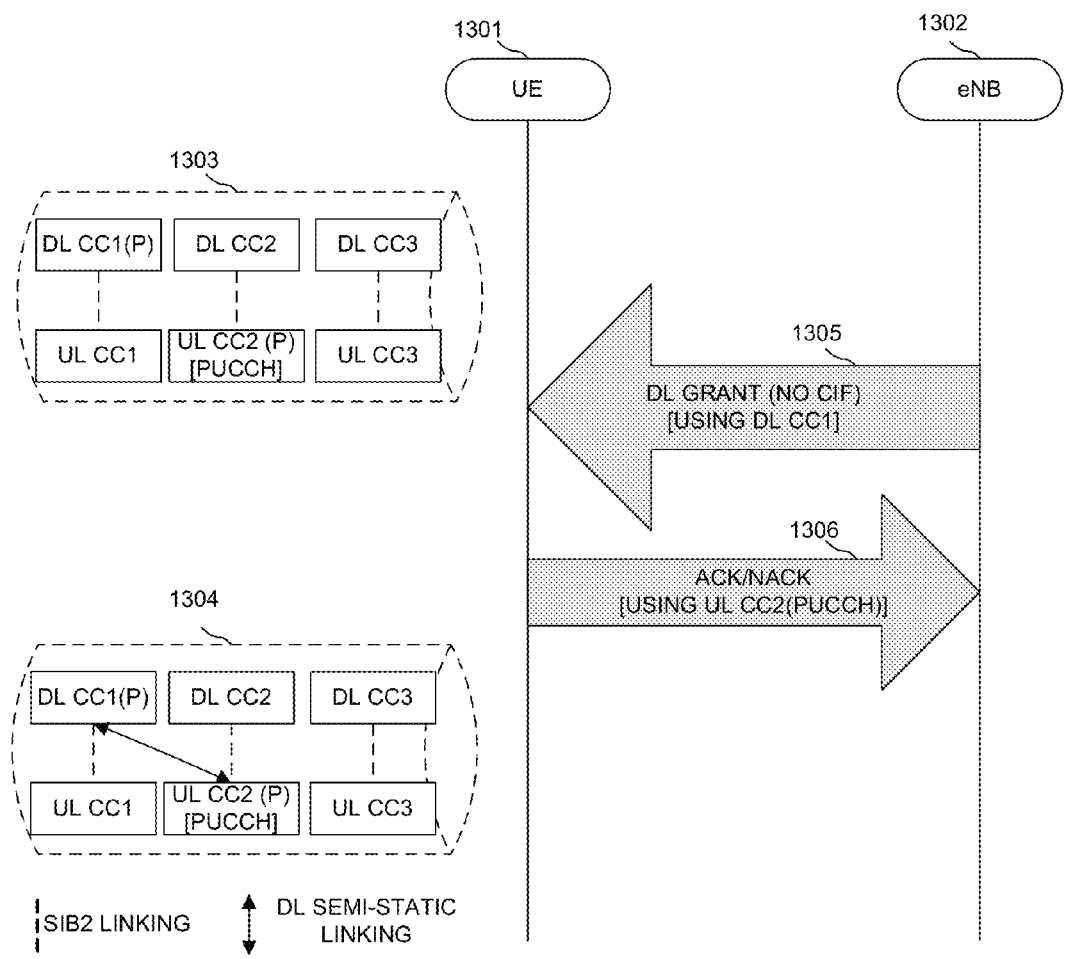
FIG. 13 illustrates a specific example of DL semi-static linking created by a DL grant without CIF.

In the current design, CIF is not included in common search space, therefore, it is possible for a UE to receive DL and UL grant without CIF even after the UE enters CA mode. For a DL grant without CIF, DL semi-static linking can be used, as illustrated in FIG. 13. FIG. 13 illustrates a specific example of DL semi-static linking created by a DL grant without CIF. UE 1301 has statically linked CCs as shown in 1303, where UL CC2 is configured to be PUCCH. At step 1305, eNB 1302 sends a DL grant on DL CC1. UE replies an ACK/NACK, at step 1306, using configured PUCCH, which is UL CC2. Block 1304 shows that a semi-static linking of DL CC1 and UL CC2 is created from this DL grant.

A UL grant without CIF has several choices in creating DL-UL linking. A UL grant can use the static linking or a DL semi-static linking. However, reuse the static SIB2 or DL semi-static linking limits the flexibility of scheduler. Since SIB2 static linking and configured PUCCH cannot be easily modified, reusing these types of linking makes it hard to adjust to the temporary load balancing demand.

Figure 14:
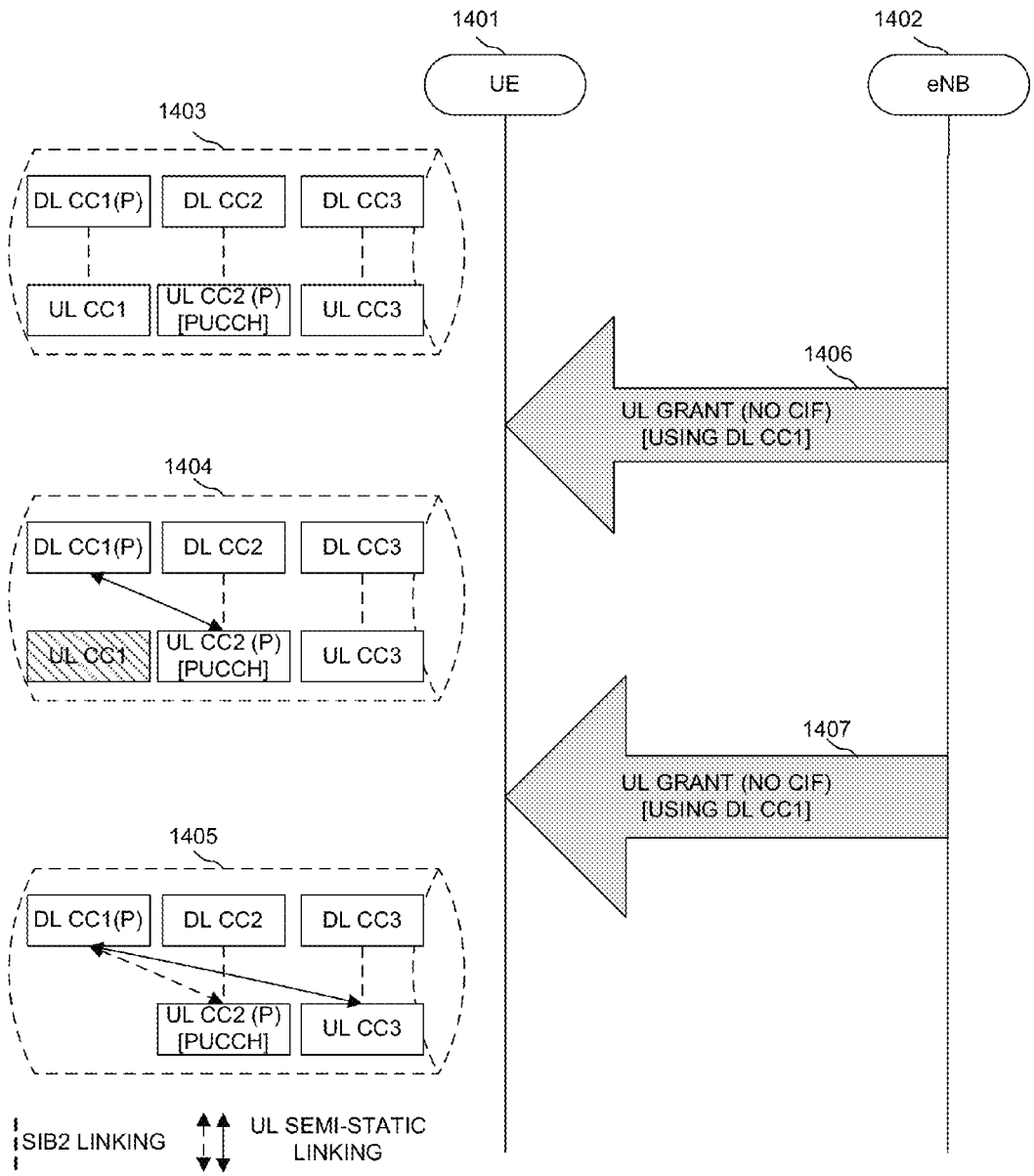
FIG. 14 illustrates a specific example of UL semi-static linking when one of the UL CC is removed.

In one embodiment of the present invention, a UL Semi-Static Linking is defined for UL grant without CIF. This linking can be created at the time of a CC addition and lasts until the time of removal of a CC. FIG. 14 illustrates a specific example of UL semi-static linking when one of the UL CC is removed. UE 1401 has statically linked CCs as shown in Block 1403, where UL CC2 is configured to be a UL semi-static linking UL CC. At Block 1404, UL CC1 is removed (e.g., denoted by slashed shade). Therefore, the UL CC1 is no longer linked with DL CC1. At step 1406, eNB 1402 sends a UL grant without CIF on DL CC1. UE 1401 therefore created a UL semi-static linking between DL CC1 and UL CC2. In addition to removed UL CC configuration, N to 1 UL semi-static linking can be created. At step 1407, eNB 1402 sends another UL grant without CIF on DL CC1. A new UL semi-static linking between DL CC1 and UL CC3 can be created. The resulting linking is as shown in Block 1405.

The different types of DL-UL linking have different characteristics, thus can be used in different types of applications accordingly. In a first example, different types of DL-UL linking can be used for different types of PRACH application. In one embodiment, for contention based Random Access (RA), SIB2 static linking is used. When a UE is configured with PRACH resource on a UL CC, the SIB2 linked DL CC should always be available to the UE. Further, static linking is used to decide the UL CC of a UL grant for Msg3. Following the PHICH rule, PHICH for Msg3 is provided on the DL CC where the UE received the RAR, for which the linking is also the static linking.

Figure 15A:
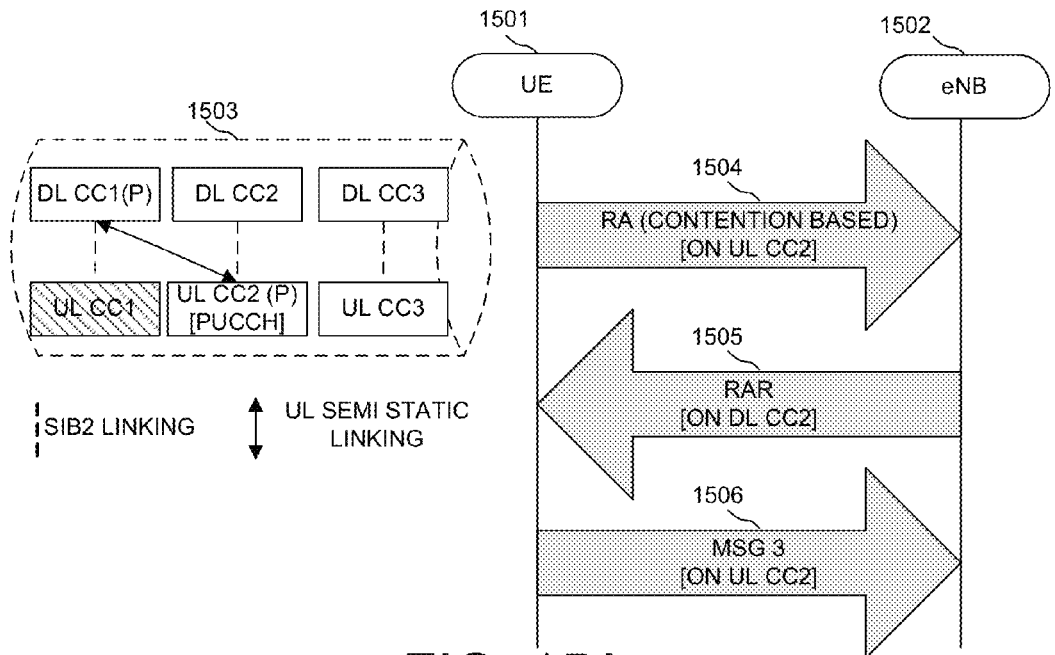
FIG. 15A illustrates a specific example of a contention based Random Access (RA) process.

FIG. 15A shows a specific example of a contention based RA process. UE 1501 has statically linked CCs as shown in Block 1503. A UL semi-static linking between DL CC1 an UL CC2 also exists for UE 1501. UL CC1 is removed (e.g., denoted by slashed shade). At step 1504, UE 1501 initiates a contention based RA process on UL CC2. eNB 1502 replies with RAR on the DL CC2, which is statically linked with UL CC2, where the step 1504 is initiated. UE 1501, at step 1506, sends Msg3 using UL CC2, which is statically linked with DL CC2.

Figure 15B:
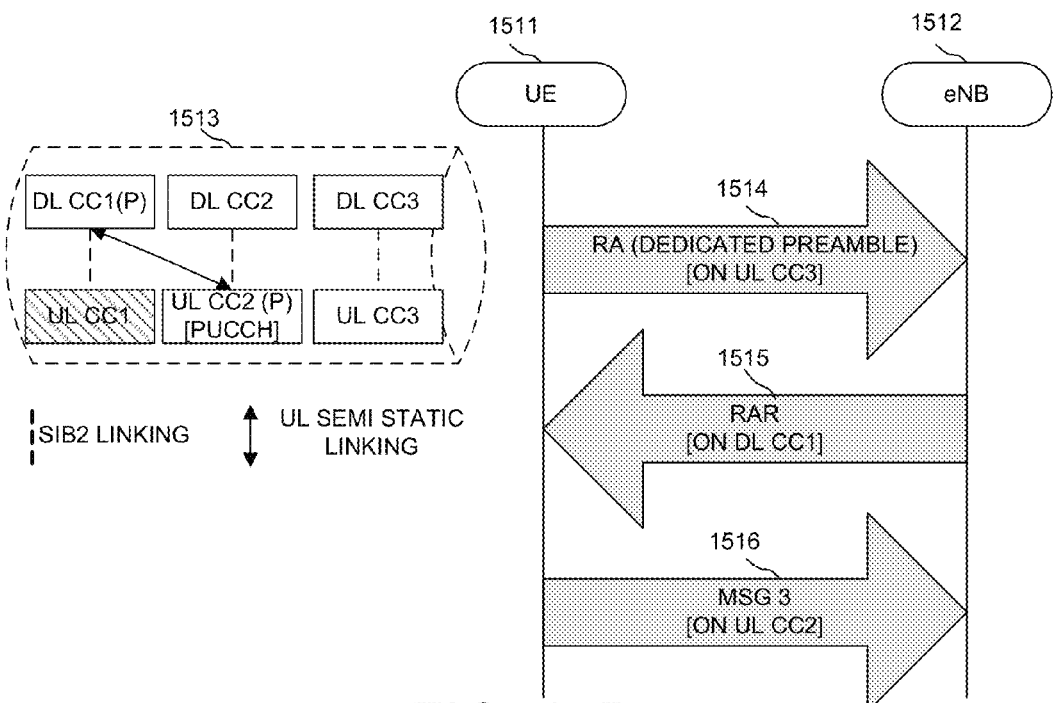
FIG. 15B illustrates a specific example of a RA process with dedicated preamble.

For RA with dedicated preamble, static linking can also be used. In another embodiment, however, eNB can decide which CC to send RAR and UL semi-static linking is used to decide the UL CC of the Msg3 grant, where the grant in RAR can be seen as a UL grant without CIF and applies the same procedure. FIG. 15B illustrates a specific example of a RA process with dedicated preamble. UE 1511 has statically linked CCs as shown in Block 1513. A UL semi-static linking between DL CC1 an UL CC2 also exists for UE 1511. UL CC1 is removed (e.g., denoted with slashed shade). UE 1511, at step 1514 initiates a RA with dedicated preamble using UL CC3. Since UE 1511's identity is known to eNB 1512 when eNB 1512 receives the dedicated preamble. eNB 1512 also knows the operating CC set of UE 1511, eNB 1512 can send RAR on any CC that UE 1511 is currently monitoring. Therefore, at step 1515, eNB 1512 send RAR on DL CC1. At step 1516, UE 1511 sends Msg3 on UL CC2, which is linked to DL CC1 through UL semi-static linking.

In a second example, power control command can come with or without CIF. In one embodiment of the invention, dynamic linking is used for power control command with CIF. In another embodiment of the invention, SIB2 static linking or UL semi-static linking is used to identify the UL CC for power control command without CIF.

A third example of DL-UL linking is for pathloss reference. In one embodiment of the invention, static link is used for pathloss reference. In another embodiment of the invention, semi-static linking, assigned or modified by RRC signaling, e.g., UL semi-static linking is used for pathloss reference.

A fourth example of DL-UL linking is for timing reference. Similar to pathloss reference, in one embodiment of the invention, static linking is used for timing reference. In another embodiment of the invention, semi-static linking assigned or modified by RRC signaling, e.g., DL or UL semi-static linking is used for timing reference.

CC management also requires changes, specifically the labeling of CC or the CIF on which RAN1 has decided the mapping should be UE specific and configured by RRC. In one embodiment, SIB2 static linking is used to decide the CIF of UL CC. In other words, if a DL CC has CIF=x, its SIB2 linked UL CC would have CIF=x as well. For N-to-1 configuration, a UL CC can have more than one CIF value. In carrier aggregation, addition or removal of DL or UL CCs is supported. With the new types of DL-UL linking, specific methods apply to these linking when DL or UL CCs are added or removed.

For CC addition/removal, DL semi-static linking should always be clear since all DL CCs are linked to the UL PCC. So does the dynamic linking since it is grant specific. However, SIB2 static linking and UL semi-static linking require further thinking. For DL CC only addition, if UL semi-static linking should be provided on configuration, then linking for grant without CIF is clear. For UL CC only addition, it was already agreed that its SIB2 linked DL CC should also be configured. Note that this SIB2 linked DL CC can be either configured with the UL CC or an existing DL CC which configured earlier by a DL CC only addition. For DL CC only removal, if this is the only SIB2 static linking to the UL CC, the UL CC should also be removed. For UL CC only removal, any UL semi-static linking to it is broken. It is optional to re-link a DL CC with broken UL semi-static linking to another UL CC. Above restriction assures linking would be always clear after CC addition/removal.

If LTE Release-8/9 compatible CC is assumed, then system information or SI for UE operation would always be broadcasted on that cell. It was agreed that dedicated signaling is used to provided necessary SI when CC addition. However, it is unknown whether the SI provided by dedicated signaling or dedicated SI should always be identical to the SI provided by broadcast signaling or broadcasted SI. If they are forced to be identical, when eNB does not want to configure PUCCH or PRACH for a CC, it still has to include those UL SIs on the dedicated SI and find another way to tell the UE not to use it. Since this dedicated SI is provided on dedicated resource, there seems to be no backward compatibility problem. Therefore, it is proposed to make the UL SI info optional in dedicated SI.

For PRACH IE, if it is absent, it implies that PRACH is not configured for the UE on the UL SCC. Otherwise, PRACH resource is configured for the UE. For PUCCH IE, if it is absent, it implies that this is a UL SCC.

Although the present invention has been described in connection with certain specific embodiments for instructional purposes, the present invention is not limited thereto. For example, although an LTE-advanced mobile communication system is exemplified to describe the present invention, the present invention can be similarly applied to all carrier aggregation-based mobile communication systems. Accordingly, various modifications, adaptations, and combinations of various features of the described embodiments can be practiced without departing from the scope of the invention as set forth in the claims.

What is claimed is:

1. A method comprising:
   receiving an activation or deactivation command for one or more component carriers (CCs) by a user equipment (UE) in a wireless communication network, wherein the one or more CCs are initialized;
   determining a current state of each CC in the activation or deactivation command; and
   deriving a plurality of instructions corresponds to the one or more CCs based on the command, wherein the UE activates a CC if and only if the current state of the CC is deactivated and a corresponding instruction is for activation, wherein the UE deactivates the CC if and only if the current state of the CC is activated and a corresponding instruction is for deactivation, and wherein the UE does not change the current state of the CC otherwise.

2. The method of claim 1, wherein the command is contained in a media access control (MAC) control element (CE), and wherein each bit is associated with an activation or deactivation instruction for a corresponding CC.

3. The method of claim 1, further comprising:
   starting an deactivation timer for a secondary CC (SCC) based on a set of predefined events; and
   deactivating the SCC when the deactivation timer expires.

4. The method of claim 3, wherein the set of predefined events comprises at least one of a secondary CC is activated, a downlink assignment is received, an uplink grant is received, a configured transmission takes place, and an activation command is received.

5. The method of claim 1, further comprising:
   transmitting feedback information in respond to the command based on an activation or deactivation status, wherein the activation status indicates the CC is activated and the deactivation status indicates the CC is deactivated.

6. The method of claim 1, wherein the UE activates a secondary CC (SCC), the activation involves:
   activating the SCC before a predefined time;
   staring a deactivation timer associated with the SCC; and
   triggering a power headroom reporting (PHR) procedure associated with the SCC.

7. The method of claim 1, wherein the UE deactivates a secondary CC (SCC), the deactivation involves:
- deactivating the SCC before a predefined time;
- stopping a deactivation timer associated with the SCC; and
- flushing all Hybrid ARQ (HARQ) buffers associated with the SCC.

8. A method comprising:
- receiving an activation or deactivation command for one or more component carriers (CCs) by a user equipment (UE) in a wireless communication network, wherein the one or more CCs are initialized;
- deriving a plurality of instructions corresponds to the one or more CCs based on the command, wherein the UE activates a CC if and only if a current state of the CC is deactivated and a corresponding instruction is for activation, wherein the UE deactivates the CC if and only if the current state of the CC is activated and a corresponding instruction is for deactivation, and wherein the UE does not change the current state of the CC otherwise; and
- transmitting feedback information in respond to the command based on an activation or deactivation status, wherein the activation status indicates the CC is activated and the deactivation status indicates the CC is deactivated.

9. The method of claim 8, wherein the command is contained in a media access control (MAC) control element (CE), and wherein each bit is associated with an activation or deactivation instruction for a corresponding CC.

10. The method of claim 8, further comprising:
- starting an deactivation timer for a secondary CC (SCC) based on a set of predefined events; and
- deactivating the SCC when the deactivation timer expires.

11. The method of claim 10, wherein the set of predefined events comprises at least one of a secondary CC is activated, a downlink assignment is received, an uplink grant is received, a configured transmission takes place, and an activation command is received.

12. The method of claim 8, wherein the UE activates a secondary CC (SCC), the activation involves:
- activating the SCC before a predefined time;
- staring a deactivation timer associated with the SCC; and
- triggering a power headroom reporting (PHR) procedure associated with the SCC.

13. The method of claim 8, wherein the UE deactivates a secondary CC (SCC), the deactivation involves:
- deactivating the SCC before a predefined time;
- stopping a deactivation timer associated with the SCC; and
- flushing all Hybrid ARQ (HARQ) buffers associated with the SCC.

* * * * *

UNITED STATES PATENT AND TRADEMARK OFFICE
CERTIFICATE OF CORRECTION

PATENT NO.       : 9,516,532 B2
APPLICATION NO.  : 14/168369
DATED            : December 6, 2016
INVENTOR(S)      : Chia-Chun Hsu et al.

Page 1 of 1

It is certified that error appears in the above-identified patent and that said Letters Patent is hereby corrected as shown below:

In the Claims

Column 12, Line 65, the word "staring" should be "starting".

Column 14, Line 17, the word "staring" should be "starting".

Signed and Sealed this
Seventh Day of February, 2017

Michelle K. Lee
*Director of the United States Patent and Trademark Office*